United States Patent
Burns, Jr. et al.

(10) Patent No.: US 6,245,160 B1
(45) Date of Patent: Jun. 12, 2001

(54) METHOD FOR CLEARING GAS LINES

(75) Inventors: James E. Burns, Jr., Stafford Springs; James S. Yablonski, Simsbury; Crawford Allen, Old Saybrook; Brian Martin, South Windsor; Christopher Malone, Coventry; Edward LaPointe, Manchester, all of CT (US)

(73) Assignees: The Spencer Turbine Company, Windsor; Connecticut Natural Gas Corporation, Hartford, both of CT (US)

( * ) Notice: Subject to any disclaimer, the term of this patent is extended or adjusted under 35 U.S.C. 154(b) by 0 days.

(21) Appl. No.: 09/570,694

(22) Filed: May 12, 2000

Related U.S. Application Data

(62) Division of application No. 09/097,533, filed on Jun. 12, 1998, now Pat. No. 6,063,151.

(51) Int. Cl.⁷ .................. B08B 5/04; B08B 9/027
(52) U.S. Cl. .................. 134/21; 134/22.11; 134/24; 134/8
(58) Field of Search .................. 134/8, 21, 22.11, 134/24

(56) References Cited

U.S. PATENT DOCUMENTS

| | | | |
|---|---|---|---|
| 2,230,425 | 5/1941 | Finnegan | 302/17 |
| 3,485,671 | 12/1969 | Stephens | 134/7 |
| 3,740,933 | 6/1973 | Hollowell | 55/429 |
| 3,775,951 | 12/1973 | Eicholz et al. | 55/417 |
| 3,780,502 | 12/1973 | Dupre et al. | 55/337 |
| 3,870,489 | 3/1975 | Shaddock | 55/314 |
| 3,926,596 | 12/1975 | Coleman | 55/304 |
| 4,017,281 | 4/1977 | Johnstone | 55/334 |
| 4,062,664 | 12/1977 | Dupre et al. | 55/319 |
| 4,133,658 | 1/1979 | Callewyn | 55/315 |
| 4,224,043 | 9/1980 | Dupre | 55/319 |
| 4,509,963 | 4/1985 | Jackson | 55/324 |
| 4,723,969 | 2/1988 | DeMarco | 55/97 |
| 4,820,315 | 4/1989 | DeMarco | 55/1 |
| 4,869,737 | 9/1989 | Parenti | 55/213 |
| 5,045,098 | 9/1991 | Poor | 55/300 |
| 5,108,471 | 4/1992 | Poborsky | 55/186 |
| 5,226,938 | 7/1993 | Bailey et al. | 55/305 |
| 5,259,854 | 11/1993 | Newman | 55/320 |
| 5,433,763 | 7/1995 | Shagott et al. | 55/323 |
| 5,591,244 | 1/1997 | Vross et al. | 55/356 |
| 5,762,664 | 6/1998 | Vross et al. | 55/319 |

Primary Examiner—Zeinab El-Arini
(74) Attorney, Agent, or Firm—McCormick, Paulding & Huber LLP

(57) ABSTRACT

A method for clearing natural gas service lines includes providing an independently operable vacuum clearing unit having a frame supporting a centrifugal blower, an internal combustion engine for operating the blower and a bag separator connected to an air intake on the blower. The blower is exhausted above the truck through an absolute (HEPA) filter. A drum top separator selectively mounted on the open upper end of one of a plurality of waste barrels releasably secured in fixed position on the truck is connected between the vacuum clearing unit and an inlet port accessible externally of the truck. The inlet port is connected by an elongated flexible service hose and a service hose adapter to a gas service line to be cleared. The vacuum clearing unit is then operated, thereby drawing any debris present in the gas line through the unit and into one of the plurality of waste barrels.

17 Claims, 3 Drawing Sheets

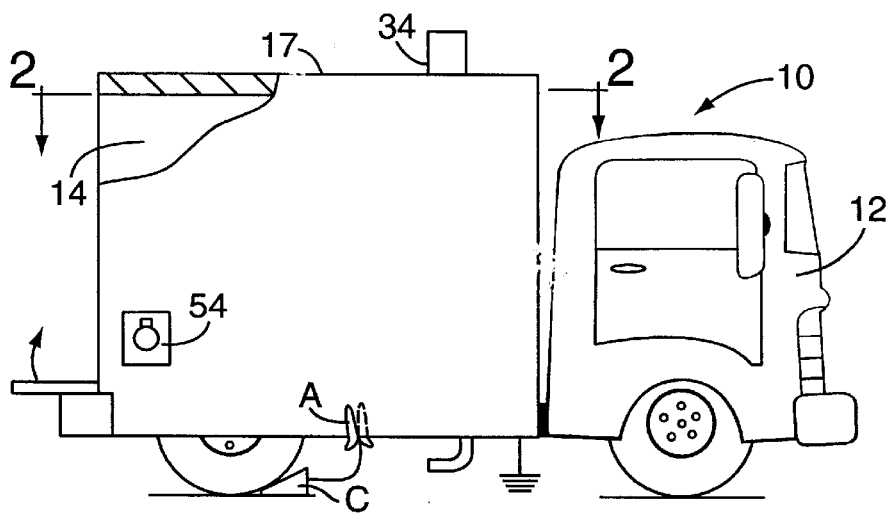
FIG. 1
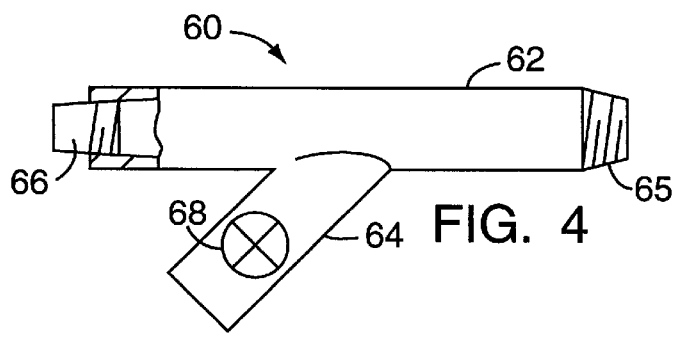
FIG. 4
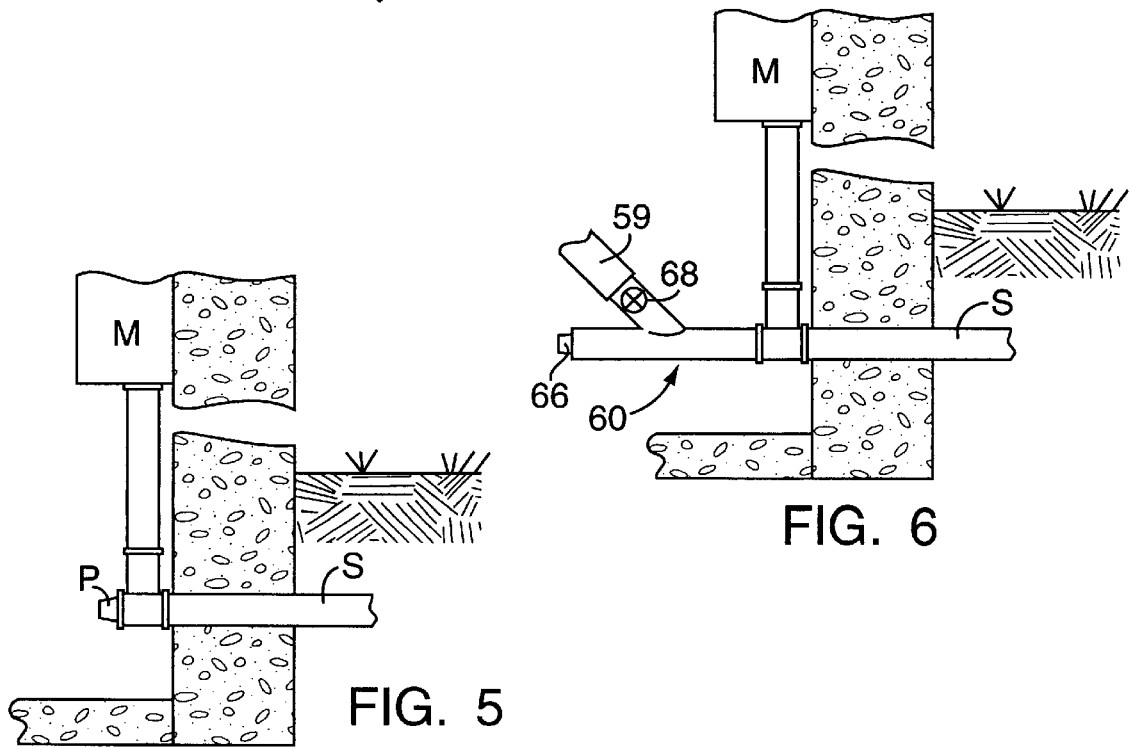
FIG. 5
FIG. 6

METHOD FOR CLEARING GAS LINES

This is a division of application Ser. No. 09/097,533 filed on Jun. 12, 1998, now U.S. Pat. No. 6,063,151.

FIELD OF INVENTION

The present invention relates to an improved apparatus and method for clearing natural gas lines.

BACKGROUND OF THE INVENTION

Low pressure gas distribution systems are prone to collecting liquids through condensation and inward liquid seepage. Aged distribution systems presently in use in many municipalities are often cast iron or steel and further prone to collecting dust and rust scale, particularly when flow direction is reversed. These conditions pose serious operational problems for utilities. Such problems often occur during the coldest time of year when throughput is maximized and weather condition make servicing difficult.

Polychlorinated biphenyl (PCB), presently classified as a hazardous material, has been used as a lubricant in compressors employed to boost gas pressure in the long transmission lines which deliver natural gas to utilities for local distribution. Even slight leakage of this compressor lubricant into the transmission lines can, over a prolonged period, result in the accumulation of pockets of the material at low points in the gas transmission system, presenting a potential source of further contamination of distribution systems supplied by the long transmission lines. Consequently, an environmentally responsible utility must consider that all liquid waste material removed from its gas service lines is PCB contaminated and strictly adhere to all regulations mandated for the safe disposal of hazardous materials. Such compliance usually proves quite costly.

Heretofore it has been common practice to use "off-the-shelf" portable canister type electric vacuum machines equipped with high-efficiency particulate air (HEPA) filters on the exhaust outlets thereof to clear clogged gas mains and services. However, where a portable machine of the aforedescribed type is used it is generally necessary to rely upon the customer's electric service to power the machine. This practice has been an occasional source of customer dissatisfaction. The available customer power source, usually 110v, imposes a further limitation upon the capacity of the machine which may be employed. As a result, a machine which can be used may lack the power to effectively clear a service of dust, rust scale, oils and water while operating in an environmentally responsible manner. The present invention is concerned with aforedescribed general problems.

Accordingly, it is the general aim of the present invention to provide a mobile self-powered, independently operable vacuum system which has sufficient power to clear gas lines of dust, rust scale, oils and water and water in an effective and environmentally responsible manner and which may also be employed to perform other incidental cleaning operation associated with a gas distribution system, as, for example, clearing distribution system valve boxes. It is a further aim of the present invention to provide an improved method for performing clearing operations on gas distribution systems in an environmentally responsible manner while substantially reducing hazardous waste material disposal cost.

SUMMARY OF THE INVENTION

In accordance with the present invention, a mobile apparatus for clearing gas lines includes a motor vehicle having a cargo compartment, an independently operable vacuum producing unit mounted in fixed position in the cargo compartment and having a frame, a vacuum producer mounted on the frame and having a first gas inlet conduit and a first gas outlet conduit, a high efficiency particulate air (HEPA) filter having an inlet connected to the first gas outlet conduit, an engine mounted on the frame and drivingly connected to the vacuum producer, and a tubular bag separator mounted on the frame and having a second gas inlet conduit and a second gas outlet conduit, the second gas outlet conduit being connected to the first gas inlet conduit on the vacuum producer. A means is provided on the vehicle for releasably securing at least one waste disposal barrel in fixed position relative to the vehicle and within the cargo compartment. A centrifugal separator is also provided for positioning on an open upper end of the one waste disposal barrel and includes a third gas inlet conduit and a third gas outlet conduit. The third gas outlet conduit is connected to the second gas inlet conduit on the tubular bag separator. An elongated flexible service hose and an associated hose adapter for connecting the third gas inlet conduit to a gas line to be cleared are carried by the vehicle and comprise part of the apparatus. The hose adapter may be arranged to facilitate "snaking" of a gas service line while the service hose remains connected to the gas service line.

BRIEF DESCRIPTION OF THE DRAWINGS

FIG. 1 is a side elevational view of a mobile apparatus for clearing a gas line and embodying the present invention.

FIG. 4 is a somewhat further enlarged side elevational view of a hose adapter for connection to a gas line to be cleared.

FIG. 5 is a somewhat schematic fragmentary elevational view showing a portion of a typical low pressure gas service line at a point of building entry.

FIG. 6 is similar to FIG. 5, but shows a service hose adapter and service hose connected to the gas service line.

DETAILED DESCRIPTION OF PREFERRED EMBODIMENT AND METHOD

Figure 2:
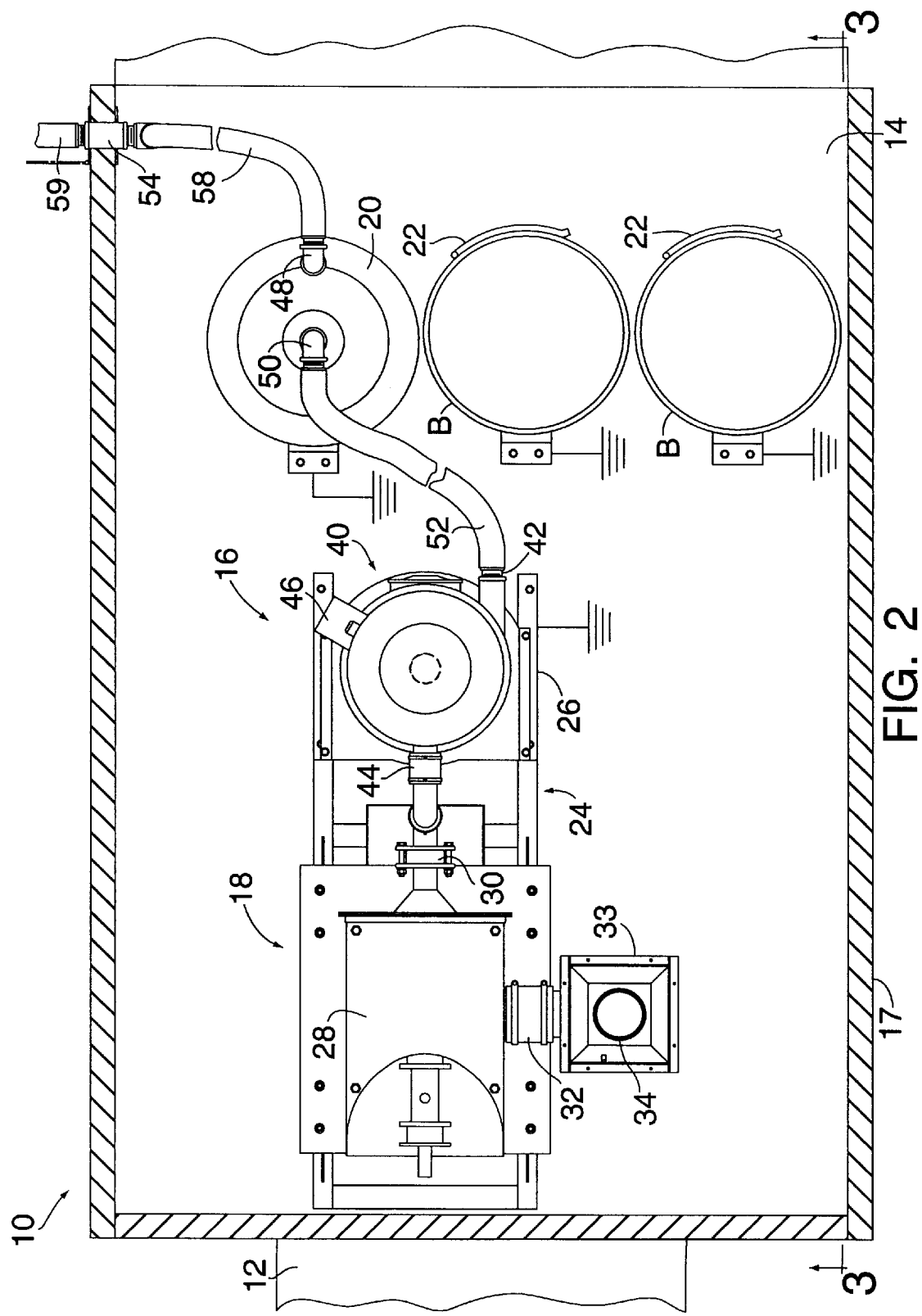
FIG. 2 is a somewhat enlarged fragmentary sectional view taken along the line 2—2 of FIG. 1.

In the drawings and in the description which follows, the invention is illustrated and described with reference to a mobile natural gas line clearing apparatus indicated generally by the reference numeral 10. The illustrated apparatus 10 essentially comprises a motor vehicle or truck 12 which has a cargo compartment 14 containing an independently operable on-board vacuum clearing system shown in FIGS. 2 and 3 and designated generally by the numeral 16.

Although any suitable truck may be used in practicing the invention, a box truck is presently preferred. The illustrated box truck 12 has a box 17 defining the substantially enclosed cargo compartment 14 which protects the operational components of the vacuum system 16 from exposure to the elements, thereby enabling the system 16 to be operated in any and all weather to provide year-round routine gas line maintenance service and assure prompt, efficient response when emergency situations occur.

Figure 3:
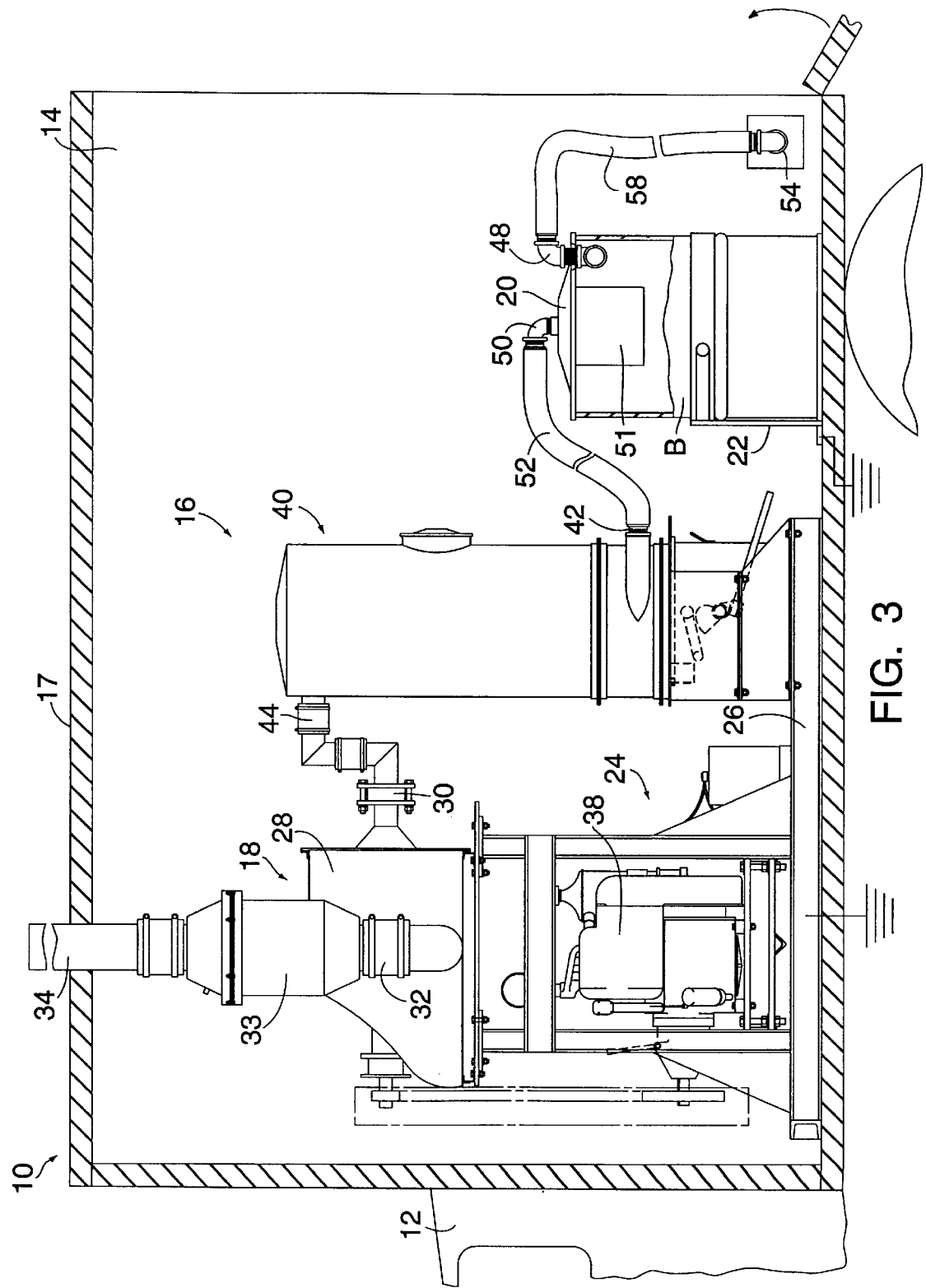
FIG. 3 is a somewhat enlarge fragmentary sectional view taken along the line 3—3 of FIG. 2.

Considering now the vacuum system in further detail, and referring particularly to FIGS. 2 and 3, the illustrated system 16 essentially comprises an independently operable vacuum producing unit, indicated generally at 18, mounted in fixed position within the cargo compartment 14, and a centrifugal separator 20. The separator 20 is operably connected to the vacuum producing unit 18 and adapted for selective positioning on an open upper end of one of a plurality of waste containers or barrels B, B for receiving hazardous or non-hazardous waste materials and located within the cargo compartment 14 proximate a rear opening in the cargo compartment. Suitable quick-release barrel clamping devices mounted on the vehicle in fixed position within the cargo compartment and indicated by the numerals 22, 22 releasably secure the illustrated barrels B, B in fixed positions within the cargo compartment 14.

The vacuum producing unit 18 has a frame, indicated generally at 24, which includes an integral skid 26. The skid forms the lowermost portion of the frame. A vacuum producer or centrifugal blower 28 mounted in fixed position on an upper portion of the frame 24 includes tubular gas inlet and outlet fittings or conduit connections indicated at 30 and 32, respectively. The presently preferred vacuum producer 28 comprises a Spencer Model No. 20205A-BD Vacuum Producer of four bearing overhung design, manufactured and marketed by The Spencer Turbine Company, Windsor, Conn. an assignee of the present Invention. A high-efficiency particulate air (HEPA) filter 33, operably connected to the tubular gas outlet fitting 32 on the vacuum producer by a flexible hose connection and hose clamps, is vented upwardly through the roof of the cargo compartment 14 by a tubular conduit or stack 34 which extends through and for some distance above the roof of the cargo compartment. The presently preferred HEPA filter employed in practicing the invention has a 99.97% efficiency rating at 0.3µ. A suitable HEPA filter of the type illustrated in the drawings and hereinbefore described is available from Koch Filter Corporation, Louisville, Ky.

The vacuum producing unit 18 further includes an independent power source for operating the vacuum producer 28 and which comprises an internal combustion engine 38 mounted on the frame 24 below the vacuum producer 28 and drivingly connected to the vacuum producer by a drive belt and associated drive pulleys. A 20 horsepower Model VH4D Wisconsin Gasoline Powered Engine equipped with a clutch is the presently preferred power source. A conventional ignition and starter switch (not shown) for starting and stopping the engine 38 is preferably located within the cargo compartment in close proximity to the engine 38. However, another electrical switch for stopping the engine 38 is preferably positioned on the vehicle 12 externally of the cargo compartment 14, so that the engine 38 may be stopped in the event of an emergency without entering the cargo compartment.

The independently operable vacuum clearing system 16 further includes a tubular bag separator, indicated generally at 40, mounted in fixed position on the frame 24, substantially as shown. The illustrated bag separator has tubular gas Inlet and outlet fittings or conduit connections indicated at 42 and 44, respectively, and also includes a manually operated bag shaker 46. The gas outlet conduit connection 44 on the bag separator is connected to the gas inlet conduit connection 30 on the vacuum producer 28 by a flexible hose connection and associated hose clamps.

The presently preferred tubular bag separator, manufactured and marketed by The Spencer Turbine Company, Windsor, Conn., comprises a Spencer Model TD220A-MOD 20" Tubular Bag Separator, Includes a 2¼ cubic foot removable aluminum dirt can and 12 tubular bag filters of electrically grounded polyester filament material and provides 31 square feet of filtration area. All of the afore-described operational components which include the vacuum producer 28, the Internal combustion engine 38 and the tubular bag separator 40 are electrically grounded to the frame 24, which is, in turn, electrically grounded to the chassis of the motor vehicle 12. The clamping devices 22, 22 are also electrically grounded to the chassis of the motor vehicle 12 and provide means for electrically grounding the waste barrels B, B which are releasably secured by clamping devices as hereinbefore discussed.

The presently preferred centrifugal separator 20, is also manufactured and marketed by The Spencer Turbine Company, and is further identified as a Spencer Model No. BT114CB-MOD 14" Centrifugal Separator of drum top design. The separator is made from abrasive resistant steel and has a stainless steel gas inlet fitting. The illustrated centrifugal separator 20 is particularly adapted for positioning on the open upper end of a selected one of the drums or waste barrels B, B to provide a substantial closure for the opening in the barrel and includes a gas inlet fitting or conduit connection 48, a gas outlet fitting or conduit connection 50, and a generally cylindrical tubular baffle 51 which is disposed within an associated barrel B, as shown in FIG. 3. The outlet fitting 50 on the centrifugal separator is connected in communication with the gas inlet fitting 42 on the tubular bag separator by an elongated flexible static conductive jumper hose 52, substantially as shown. Another elongated flexible static conductive jumper hose 58 connects the inlet fitting 48 on the centrifugal separator 20 in communication with a gas inlet valve 54 mounted on the vehicle 12. The elongated jumper hoses facilitate selective positioning of the separator 20 on any one of the barrels B, B without changing the positions of the barrels. The inlet valve 54 defines a gas inlet port or receptacle for receiving a hose connection in releasable plugging engagement therein and includes a spring loaded closure or cover moveable between open and closed positions relative to the inlet port. The cover is spring biased to its closed position when the inlet valve 54 is not in use. The inlet valve 54 is preferably mounted on an associated side wall of the box 17 for access externally of the cargo compartment 14. However, if desired, plural inlet valves 54, 54 may be provided on the outside of the box 17 and may be located at opposite sides of the vehicle 12 for convenience. Where such a dual inlet valve arrangement is employed a Y connection is provided between jumper hoses connected to the inlet valves and the inlet fitting 48 on the centrifugal separator 20.

A length of heavy duty static conductive rubber service hose, indicated at 59 in FIGS. 2 and 6, and an associated service hose adapter 60 (FIG. 4) for connecting one end of the service hose 59 to a gas service line to be cleared are carried on the vehicle 12 and comprise part of the apparatus 10. The service hose 59 is used to establish communication between the illustrated inlet valve 54 on the vehicle and a gas service line to be cleared. It is presently anticipated that a 150 foot length of flexible service hose will be sufficient to provide access to most gas service lines.

The hose adapter 60, best shown in FIG. 4, may be characterized as a Y-branch pipe fitting which has a straight run 62 and a branch 64. One end of the straight run 62 has a male pipe thread 65 thereon for connection to a gas service line to be cleared. The opposite end of the straight run is internally threaded and receives a pipe plug 66. The free end of the branch 64 is sized to receive an associated end portion of the service hose 59 thereon, as best shown in FIG. 6. A manually operated check valve 68 associated with the branch 64 is movable between open and closed positions for controlling flow of gas and waste material from the main part 62 through and out of the branch 64 and into the service hose 59 when the apparatus Is connected to an associated gas service line, as hereinafter described.

In FIG. 5 a typical gas service line to be cleared is shown at a point of below ground entry into an associated building. The gas service line is indicated by the letter S. Such a service fine is normally provided with a removable pipe plug P at a location between its point of entry into a building and an associated gas meter connected to the service line. The meter is indicated by the letter M in FIG. 5.

Preparatory to performing a clearing operation on a gas service line, such as the illustrated service line S, the vehicle 12 is parked at the most convenient location which allows connection of the service hose 59 between the vehicle 12 and the gas service line S.

Before attempting to establish connection with a gas service line to be cleared, one or more wheels of the vehicle 12 must be properly chocked to prevent vehicle movement, the doors, tailgate or other closures for the box 17 must be opened and the vehicle must also be properly electrically grounded. A flexible electrical conductor provided with an alligator clip and electrically connected to a wheel chock is preferably provided for this purpose. Such a grounded wheel chock is shown in FIG. 1 and designated by the letter C. The alligator clip is indicated by the letter A.

After the vehicle 12 has been parked and properly chocked, the alligator clip A is releasably connected to the vehicle at a predetermined grounding location, as shown in FIG. 1, to assure proper electrical grounding of the vehicle chassis. After the doors and other closures on the box 17 have been opened communication may be established between the on-board cleaning system 16 and the gas service line S by connecting the service hose 59 therebetween.

After one end of the service hose 59 has been releasably connected to the inlet valve 54 on the vehicle 12 and the other or free end of the service hose 59 has been positioned near the plugged end of a gas service line S to be cleared, the plug P is removed from the gas service line and replaced by the hose adapter 60, as shown in FIG. 6, the valve 68 on the adapter 60 being in its closed position. The free end of the service hose 9 is then connected to the free end of the Y branch 64 on the hose adapter 60. Thereafter, the Internal combustion engine 38 is started, the check valve 68 on the hose adapter 60 is opened, and the clutch on the engine is engaged to place the vacuum system 16 in operation and start the gas service line clearing cycle.

If the gas service line S is seriously clogged the plug 66 may be removed from the service hose adapter 60 so that a snake (not shown) may be inserted into and through the hose adapter 60 and into the gas service line S to clear the blockage in the gas service line. When the blockage in the gas service line has been cleared, gas under pressure will flow from the service line S into the adapter 60 and follow the path of least resistance, flowing into the branch line 64 to which to the service or vacuum hose 59 is connected. Gas will flow through the service hose 59 into and through the system and will be exhausted through the HEPA filter 33 and the stack 34 to the atmosphere. Thus, no appreciable quantity of gas will escape from the open end of the adapter 60 and into the building during the snaking portion of the gas line clearing operation.

Upon completion of the gas service line clearing operation, the hose adapter 60 is removed from the gas service line S by reversing the procedure hereinbefore generally described, after which the gas service line S is again closed by replacement of the plug P. However, the vacuum system 16 should remain in operation for several minutes after the gas service line clearing operation has been completed, so that the vacuum clearing system will be thoroughly purged by drawing air through and exhausting it from the system.

Liquids, such as water and oil, and heavy solid waste materials, such as rust and scale, removed from the gas service line are entrained in the moving gas stream and will be separated from the gas stream at the centrifugal separator 20. Fine particulate material which passes through the centrifugal separator 20 will normally be in a substantially dry state when it reaches the bag separator 40. Although this dry waste material probably can be handled relative safely, it should be treated as hazardous waste, because it is a by-product of the gas service line clearing operation and the possibility exists that PCB contaminants may be present in this dry waste material.

Although the on-board vacuum cleaning system 16, hereinbefore described, is particularly adapted for clearing low pressure gas service lines, it should be understood that the vacuum system 16 may also be used to clean high pressure gas lines and perform incidental cleaning operations associated with a gas service, as, for example, the removal of non-hazardous waste material from a gas distribution system valve box.

When the vacuum system 16 is used to clear rust, scale and other undesired material from a high pressure gas line the flow of gas through the gas line or the portion of the line to be cleared is interrupted, usually by closing an appropriate valve. Gas is then vented from the line, after which the line is further purged by the introduction of air into the line. The free end of the service hose 59 is then connected to the gas line to be cleared using an adapter or other appropriate means. Since the gas line will be isolated from the remainder of the system during the clearing operation some provision for make-up air will probably be required during the vacuuming operation, which will proceed generally as aforedescribed.

If a further cleaning operation is to be performed to remove non-hazardous waste material, as, for example, a cleaning operation to remove sand, dirt, debris and water from a valve box, the centrifugal separator 20 should first be removed from a hazardous waste barrel B to which it may be attached. A cover should be promptly be placed on and secured to the hazardous waste barrel. The barrel should be marked to properly identify the contents as "hazardous waste". The centrifugal separator should then be selectively positioned on another barrel B designated to receive non-hazardous waste material. When the aforedescribed procedure is followed, the non-hazardous waste material will not be commingled with hazardous waste. Thus, the quantity of hazardous waste requiring disposal may be minimized which should result in a substantial saving in high cost hazardous waste material disposal.

The skid 26, which forms the integral part of the frame 24 enables the vacuum producing unit 18 to be loaded into and removed from the cargo compartment 14 as a unit using a forklift truck or the like to facilitate periodic servicing or overhaul.

We claim:

1. A method for clearing a gas service line comprising the steps of:

providing a motor vehicle including a cargo compartment containing an independently operable vacuum producing unit and a drum top separator connected to the vacuum producing unit and to an inlet valve for producing vacuum at the inlet valve when the vacuum producing unit is in operation;

releasably securing at least one waste disposal drum in fixed position relative to the vehicle and within the cargo compartment;

positioning the drum top separator on an open upper end of the at least one waste disposal drum;

parking the motor vehicle at a location which allows access to the gas service line to be cleared;

chocking at least one wheel on the motor vehicle to prevent vehicle movement;

electrically grounding the motor vehicle;

opening all closures for the cargo compartment;

connecting one end of an elongated flexible service hose to the inlet valve;

positioning a free end of the service hose near the gas service line to be cleared;

removing a plug from the gas service line to be cleared;

replacing the plug with a service hose adapter;

operating the vacuum producing unit to produce vacuum at the free end of the service hose, thereby drawing any debris present in the gas service line into said at least one waste disposal drum; and connecting the free end of the service hose to the adapter.

2. A method for clearing a gas service line as set forth in claim 1 including the additional step of removing a plug from the service hose adapter and inserting a snake into and through the service hose adapter and into the gas service line to clear blockage in the gas service line.

3. A method for clearing a gas service line as set forth in claim 1 wherein the step of releasably securing is further characterized as releasably securing a plurality of waste disposal drums in fixed position relative to the vehicle and within the cargo compartment and the step of positioning is further characterized as positioning the drum top separator on an upper end of a selected one of said waste disposal drums.

4. A method for clearing a gas service line as set forth in claim 1 including the additional step of closing a check valve on the service hose adapter after the gas service line clearing operation has been completed, removing the service hose adapter from the gas service line, replacing the plug in the gas line and continuing to operate the vacuum producing unit for several minutes after the service hose has been removed from the service hose adapter.

5. A method for clearing a gas line comprising the steps of:

providing a motor vehicle including a cargo compartment containing an independently operable vacuum producing unit and a drum top separator connected to the vacuum producing unit and to an inlet valve for producing vacuum at the inlet valve when the vacuum producing unit is in operation;

releasably securing at least one waste disposal drum in fixed position relative to the vehicle and within the cargo compartment;

positioning the drum top separator on an open upper end of the at least one waste disposal drum;

parking the motor vehicle at a location which allows access to the gas line to be cleared;

chocking at least one wheel on the motor vehicle to prevent vehicle movement;

electrically grounding the motor vehicle;

opening all closures for the cargo compartment;

connecting one end of an elongated flexible service hose to the inlet valve;

connecting the free end of the service hose to the gas line to be cleaned; and operating the vacuum producing unit, thereby drawing any debris present in the gas service line through the flexible service hose and into the cargo compartment.

6. A method for clearing a gas line as set forth in claim 5 including the additional steps of interrupting the flow of gas through a gas line to be cleared, purging the gas line to be cleared to remove gas from the line to be cleared after the step of interrupting has been performed and performing the step of connecting the free end after the step of purging has been performed.

7. A method for clearing a gas line as set forth in claim 5 further comprising the steps of venting the line to be cleared and introducing air into the line to be cleared after the step of venting has been performed.

8. A method for clearing a gas service line comprising the steps of:

providing a motor vehicle having a cargo compartment;

supporting in the cargo compartment an independently operable vacuum producing unit having a first gas inlet and a first gas outlet;

connecting an absolute filter to said first gas outlet;

mounting in said cargo compartment a tubular bag separator having a second gas inlet and a second gas outlet;

connecting said second gas outlet to said first gas inlet;

releasably securing in fixed position in said cargo compartment at least one waste disposal drum having an open upper end;

providing a drum top separator including a third gas inlet and third gas outlet;

positioning said drum top separator on the open upper end of the waste disposal drum;

connecting the third gas outlet to the second gas inlet;

parking the motor vehicle at a location allowing access to the gas service line to be cleared;

connecting one end of an elongated flexible service hose to the third gas inlet on the drum top separator;

positioning a free end of the service hose near the gas service line to be cleared;

operating the vacuum producing unit to produce vacuum at the free end of the service hose;

removing a plug from the gas service line to be cleared;

replacing the plug with a service hose adapter; and connecting the free end of the service hose to the service hose adapter to place the service hose in communication with the gas service line to be cleared, thereby drawing any debris present in the gas service line though the service hose and into said cargo compartment.

9. A method for clearing a gas service line as set forth in claim 8 wherein the step of connecting the free end of the service hose to the service hose adapter is performed while the step of operating the vacuum producing unit is being performed.

10. A method for clearing a gas service line as set forth in claim 9 including the additional steps of removing a plug from the service hose adapter and inserting a snake into and through the service hose adapter and into the gas service line to clear blockage in the gas service line.

11. A method for clearing a gas service line as set forth in claim 10 wherein the steps of removing a plug and inserting a snake are performed after the free end of the surface hose has been connected to the service hose adapter and while the step of operating the vacuum producing unit is being performed.

12. A method for clearing a gas service line as set forth in claim 9 wherein said method includes the additional steps of electrically grounding said independently operable vacuum producing unit to the motor vehicle and electrically grounding the motor vehicle and wherein the steps of electrically grounding are performed before the step of operating the vacuum producing unit.

13. A method for clearing a gas service line as set forth in claim 12 further characterized by the step of grounding the motor vehicle by chocking at least one wheel of the motor vehicle with a wheel chock to prevent vehicle movement after the vehicle has been parked and electrically grounding the motor vehicle to the wheel choke.

14. A method for clearing a gas service line as set forth in claim 8 including the additional step of exhausting gas from the absolute filter at a position outside of the cargo compartment.

15. A method for clearing a gas service line as set forth in claim 14 wherein the step of exhausting is further characterized as exhausting gas from the filter to the atmosphere above and externally of the cargo compartment.

16. A method for clearing a gas service line as set forth in claim 8 including the additional step of marking the waste disposal drum to indicate that it contains hazardous waste.

17. A method for clearing a gas service line as set forth in claim 8 wherein the step of connecting the service hose to the third gas inlet is further characterized as mounting an inlet valve on an outer wall of the cargo compartment accessible externally of the cargo compartment, connecting the third gas inlet to the inlet valve within the cargo compartment and connecting the service hose to the inlet valve externally of the cargo compartment.

* * * * *